United States Patent
Moncomble et al.

(10) Patent No.: US 12,250,619 B2
(45) Date of Patent: Mar. 11, 2025

(54) METHOD FOR MANAGING AN EMERGENCY STATE OF A FIRST VEHICLE AND ASSOCIATED MANAGING DEVICE

(71) Applicant: ORANGE, Issy les Moulineaux (FR)

(72) Inventors: Ghislain Moncomble, Chatillon (FR); Mathieu Lefebvre, Chatillon (FR); Jean-Marc Odinot, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 334 days.

(21) Appl. No.: 17/786,846

(22) PCT Filed: Dec. 17, 2020

(86) PCT No.: PCT/FR2020/052510
§ 371 (c)(1),
(2) Date: Jun. 17, 2022

(87) PCT Pub. No.: WO2021/123648
PCT Pub. Date: Jun. 24, 2021

(65) Prior Publication Data
US 2023/0034843 A1 Feb. 2, 2023

(30) Foreign Application Priority Data

Dec. 20, 2019 (FR) .................................. 1915167

(51) Int. Cl.
*H04W 4/90* (2018.01)
*H04W 4/40* (2018.01)
(52) U.S. Cl.
CPC ............... *H04W 4/90* (2018.02); *H04W 4/40* (2018.02)

(58) Field of Classification Search
CPC ........ H04W 4/40; H04W 4/90; G08G 1/0965; G08G 1/096716; G08G 1/096758; G08G 1/096775; G08G 1/087
See application file for complete search history.

(56) References Cited

U.S. PATENT DOCUMENTS

| | | | |
|---|---|---|---|
| 9,146,121 B2* | 9/2015 | Husain | G08G 1/205 |
| 10,127,813 B2* | 11/2018 | Walsh | G08G 1/0965 |
| 10,403,137 B1* | 9/2019 | Grant | G08G 1/205 |
| 10,645,561 B1* | 5/2020 | Guo | H04W 4/42 |
| 2009/0174572 A1 | 7/2009 | Smith | |

(Continued)

FOREIGN PATENT DOCUMENTS

FR 3076046 A1 6/2019

OTHER PUBLICATIONS

International Search Report dated May 7, 2021 for corresponding International Application No. PCT/FR2020/052510, Dec. 17, 2020.

(Continued)

*Primary Examiner* — Siu M Lee
(74) *Attorney, Agent, or Firm* — David D. Brush; Westman, Champlin & Koehler, P.A.

(57) ABSTRACT

A method for managing an emergency state of a first vehicle, implemented by a remote server. The method includes: receiving an indication of the emergency state of the first vehicle; estimating a first geographical area in which the first vehicle is able to be positioned for a given time period; and sending an alert message to at least one detecting element, positioned at a traffic lane, said at least one detecting element being able to be positioned in the first geographical area for the given time period.

11 Claims, 3 Drawing Sheets

(56) References Cited

U.S. PATENT DOCUMENTS

2016/0210858 A1\* 7/2016 Foster ................. G08G 1/0965
2017/0364069 A1\* 12/2017 Colella ............ G08G 1/096783
2020/0342759 A1 10/2020 Moncomble

OTHER PUBLICATIONS

Written Opinion of the International Searching Authority dated May 7, 2021 for corresponding International Application No. PCT/FR2020/052510, filed Dec. 17, 2020.

French Search Report and Written Opinion dated Sep. 15, 2020 for corresponding French Application No. 1915167, filed Dec. 20, 2019.

English translation of the Written Opinion of the International Searching Authority dated May 19, 2021 for corresponding International Application No. PCT/FR2020/052510, filed Dec. 17, 2020.

European Standard, "Intelligent Transport Systems (ITS); Vehicular Communications; GeoNetworking; Part 1: Requirements", ETSI EN 302 636-1 V1.2.1 (Apr. 2014).

European Standard, "Intelligent Transport Systems (ITS); Vehicular Communications; Basic Set of Applications; Part 2: Specification of Cooperative Awareness Basic Service", Final draft, ETSI EN 302 637-2 V1.3.1 (Sep. 2014).

\* cited by examiner

METHOD FOR MANAGING AN EMERGENCY STATE OF A FIRST VEHICLE AND ASSOCIATED MANAGING DEVICE

CROSS-REFERENCE TO RELATED APPLICATIONS

This Application is a Section 371 National Stage Application of International Application No. PCT/FR2020/052510, filed Dec. 17, 2020, which is incorporated by reference in its entirety and published as WO 2021/123648 A1 on Jun. 24, 2021, not in English.

TECHNICAL FIELD

This invention relates to the field of vehicles and assisted driving of vehicles, and more specifically relates to a technique for managing an emergency state of a vehicle.

PRIOR ART

In a known manner, when a priority emergency services vehicle in operation (such as an ambulance, a fire truck or a police car) is circulating on a traffic lane, it indicates its presence to the vehicles on its path via an alerting means such as a siren or a flashing light.

By custom and/or to respect the highway code, the alerted vehicles then let the priority emergency services vehicle pass in order to facilitate its travel, for example by pulling over on the side of the road or yielding priority at an intersection.

However, the drivers of the vehicles present on the journey of the priority emergency services vehicle sometimes struggle to locate the priority emergency services vehicle, and thus can have trouble determining whether or not they must perform a maneuver in order to allow the priority emergency services vehicle to pass. For example, a driver hearing a siren may fail to determine whether the priority emergency services vehicle is approaching head-on or from behind. Similarly, a driver seeing the light signal of a flashing light can struggle to determine what lane the priority emergency services vehicle is circulating on.

Furthermore, there is currently no solution making it possible to effectively locate a vehicle which is not a priority emergency services vehicle (for example a private vehicle), but which is exceptionally in an emergency state, such as an urgency state or an offense state.

The urgency is typically a medical or life-threatening urgency, relating to one or more living beings such as human beings. The urgency thus for example relates to an injured person or a woman in labor.

The offence may be the theft of the vehicle, a vehicular highway code offence, the taking of hostages by means of the vehicle etc.

In the case of a vehicle in an offence state, this vehicle may be indicated to security forces (such as the police or local law authorities) but the location of this vehicle and the estimation of its trajectory is often very complicated. It is thus difficult to intelligently guide a security forces vehicle to such a vehicle or to alert vehicles in the environs of the presence of the vehicle in an offence state.

Furthermore, in the case of a vehicle in an urgency state, there is no reliable solution making it possible to guide a priority emergency services vehicle as quickly as possible toward the vehicle in an urgency state, so that the priority emergency services vehicle opens up the way for the vehicle in an urgency state, particularly using its alert means.

SUMMARY OF THE INVENTION

This invention relates to a method for managing an emergency state of a first vehicle, implemented by a managing device, characterized in that it comprises the following steps:
  estimating a geographical area in which the first vehicle is able to be positioned for a given time period, and
  sending an alert message to at least one detecting element, positioned at a traffic lane, said at least one detecting element being able to be positioned in the first geographical area for the given time period, the alert message comprising an element of identification of the first vehicle allowing the detection of the first vehicle by the detecting element, and
  receiving a location message of the first vehicle, comprising at least one trajectory hypothesis and/or at least one future position hypothesis of the first vehicle, said location message being sent coming from said at least one detecting element.

The method according to the invention makes it possible to alert the environment of the first vehicle of its emergency state. The alert message indicates to said at least one detecting element that the first vehicle is in an urgency state and is able to be located in the same geographical area where it is currently located. Furthermore, the alert message comprising an element of identification of the first vehicle, it allows the detection of the first vehicle by the detecting element. Thus, the alert message sent to said at least one detecting element triggers the detection of the first vehicle by said at least one detecting element.

The detecting element having detected the first vehicle, addresses a message of location of the first vehicle comprising at least one trajectory hypothesis and/or at least one future position hypothesis of the first vehicle.

In an embodiment, the geographical area is estimated as a function of said at least one trajectory hypothesis and/or said at least one future position hypothesis of the first vehicle received.

The managing device, having received the location message coming from the detecting element, estimates the geographical area in which the first vehicle (170) is able to be positioned for a given time period.

In an embodiment, the method comprises the following steps:
  receiving an indication of the emergency state of the first vehicle,
  estimating a first geographical area in which the first vehicle is able to be positioned for a given time period, and
  sending an alert message to at least one detecting element, positioned at the level of a traffic lane, said at least one detecting element being able to be positioned in the first geographical area for the given time period.

The method according to the invention makes it possible to alert the environment of the first vehicle of its emergency state and thus to adapt the vehicle traffic to the surroundings.

In a particular embodiment, the emergency state is an urgency state or an offence state.

The urgency is typically a medical or life-threatening urgency, relating to one or more living beings such as human beings. The urgency thus for example relates to an injured person or a woman in labor.

The offence may be the theft of the vehicle, a vehicular highway code offence, the taking of hostages by means of the vehicle etc.

In a particular embodiment, wherein the duration of the time period is determined as a function of at least one element from among the following elements:
- a potential travel speed of the first vehicle,
- a number of potential alternative traffic lanes by unit surface in an area around the first vehicle,
- the estimated traffic on the trajectory of the first vehicle.

In a particular embodiment, the time period is less than or equal to three minutes.

In a particular embodiment, the method further comprises a step of receiving a location message from the first vehicle, comprising at least one trajectory hypothesis and/or at least one future position hypothesis of the first vehicle, said location message being sent by a terminal associated with at least one detecting element.

The method according to the invention thus makes it possible to accurately locate the vehicle in an emergency state.

In a particular embodiment, the method further comprises the following steps:
- determining an intervening vehicle as a function of said at least one trajectory hypothesis and/or at least one future position hypothesis, the intervening vehicle being a vehicle for which the estimate of a potential duration required by said vehicle to meet the first vehicle is minimal, and
- sending a message of instruction to intervene to a terminal associated with the intervening vehicle comprising an instruction to intervene.

Thus, the intervening vehicle is determined as a function of said at least one trajectory hypothesis and/or at least one future position hypothesis coming from said at least one detecting element.

In a particular embodiment, the intervening vehicle is determined as a function of a characterizing element of said vehicle indicating an ability of said vehicle to intervene.

In a particular embodiment, the message of instruction to intervene further comprises a scenario for guiding the intervening vehicle toward the first vehicle, said guiding scenario comprising guiding instructions.

In a particular embodiment, the method further comprises the following steps:
- estimating a second geographical area associated with said intervening vehicle, as a function of a geolocation position of the intervening vehicle,
- determining at least one cooperating vehicle able to be positioned in said second geographical area,
- sending a message of instruction to cooperate to a terminal associated with said at least one cooperating vehicle, comprising an instruction to act with the aim of facilitating the progress of the intervening vehicle toward the first vehicle.

In a particular embodiment, the method further comprises the following steps:
- determining at least one collaborating element able to be positioned before the first vehicle, as a function of said at least one trajectory hypothesis and/or at least one future position hypothesis,
- sending a message of instruction to collaborate to a terminal associated with said at least one collaborating element, comprising an instruction to act to facilitate or impede the progress of the first vehicle, such as to reduce the duration required by the intervening vehicle to meet the first vehicle.

Thus, the collaborating element is determined as a function of said at least one trajectory hypothesis and/or at least one future position hypothesis received from said at least one detecting element.

In a particular embodiment:
- the instruction to act of the message of instruction to cooperate and/or message of instruction to collaborate is associated with a starting time of the action and/or a provisional duration of the action, and
- the instruction to act of the message of instruction to cooperate and/or message of instruction to collaborate pertains to the modification of a driving parameter.

The invention also relates to a device for managing an emergency state of a first vehicle, characterized in that it comprises:
- a receiving module able to receive an indication of the emergency state of the first vehicle,
- an estimating module able to estimate a first geographical area in which the first vehicle is able to be positioned for a given time period, and
- a sending module able to send an alert message to at least one detecting element, positioned at a traffic lane, said at least one detecting element being able to be positioned in the first geographical area for the given time period.

In a particular embodiment, the managing device is a remote server or a terminal associated with a traffic lane element.

In a particular embodiment, the different steps of the managing method according to the invention are determined by computer program instructions.

Consequently, the invention also relates to a computer program, on an information medium, this program including instructions suitable for implementing the steps of a managing method according to the invention.

Each of these programs can use any programming language, and be in the form of source code, object code, or intermediate code between source code and object code, such as in a partially compiled form, or in any other desirable form.

The invention also relates to an information medium readable by a computer and including instructions of a computer program as mentioned above.

The information medium can be any entity or device capable of storing the program. For example the medium may include a storage means, such as a ROM, for example a CD-ROM or a microelectronic circuit ROM, or else a magnetic recording means, for example a hard disk.

Moreover, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit wherein the program is incorporated, the circuit being suitable for executing or for being used in the execution of the method in question.

BRIEF DESCRIPTION OF THE DRAWINGS

Other features and advantages of this invention will become apparent from the description given below, with reference to the appended drawings which illustrate an exemplary embodiment thereof devoid of any limitation. In the figures.

DESCRIPTION OF THE EMBODIMENTS

Figure 1:
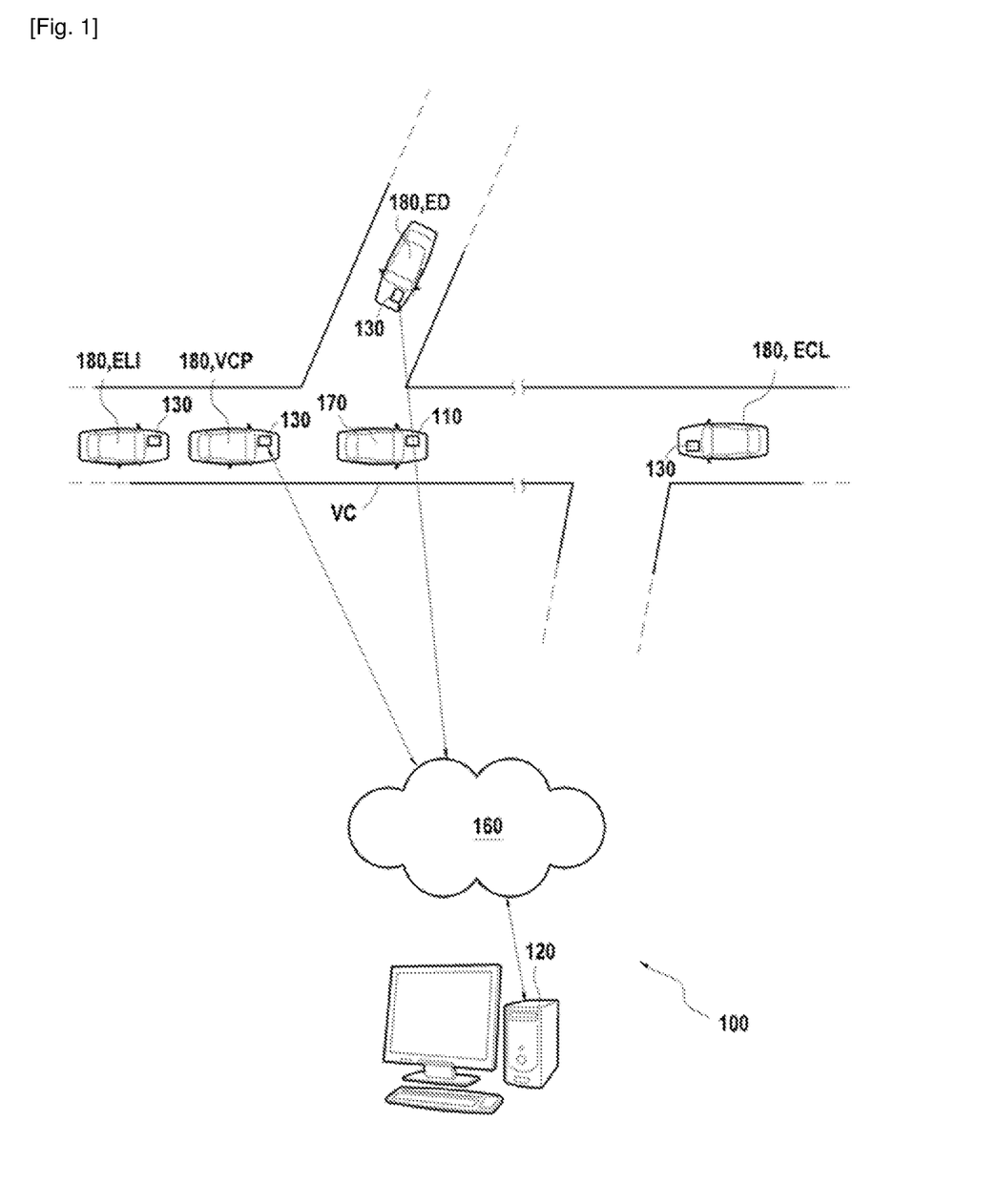
FIG. 1 schematically represents a managing system able to implement a managing method according to an exemplary embodiment of the invention.

FIG. 1 schematically represents a managing system 100 able to implement a method for managing an emergency state of a first vehicle, according to an exemplary embodiment of the invention.

The system comprises a plurality of modules, including a receiving module, an estimating module and a sending module.

The system 100 can comprise a first terminal 110 and/or a remote server 120, and at least one other terminal, the so-called second terminal 130. The system 100 can further comprise an emergency management service server (not shown).

In addition, the system 100 may comprise one or more other remote servers, for example dedicated to long-term storage (not shown).

The first terminal 110, the remote server 120, each second terminal 130 and/or the emergency management service server can be connected to a telecommunications network 160 in order to communicate with one another. No limitation is attached to the nature of the telecommunications network. It can for example by a Wi-Fi network or a mobile telephony network (3G, 4G, 5G, etc. type).

In addition, the telecommunications protocols used can be varied. The protocols used are for example the protocols BTP/GeoNet/UDP/IP (for "Basic Transport Protocol/GeoNet/User Datagram Protocol/Internet Protocol"), in cellular 4G or 5G, or MQTT/TCP/IP (Message Queuing Telemetry Transport/Transmission Control Protocol/Internet Protocol), also in cellular.

The first terminal 110 may be a mobile terminal such as a mobile phone, for example of smartphone type, a digital tablet, or a personal computer.

The first terminal 110 is associated with the first vehicle 170. The first vehicle 170 is for example located at a traffic lane VC. The first vehicle 170 can for example circulate on the traffic lane VC.

The first terminal 110 can thus be positioned on the first vehicle 170, typically inside the first vehicle 170, or incorporated into the first vehicle 170, i.e. forming part of the onboard systems of the vehicle 170.

Each second terminal 130 can be a mobile terminal such as a mobile phone, for example of smartphone type, a digital tablet, or a personal computer.

Furthermore, each second terminal 130 can be associated with an element 180 of a traffic lane, this element 180 being typically a mobile element such as a vehicle or a living being, or a fixed element, such as a road sign, a speed camera or a video camera.

Each traffic lane element 180 is for example positioned at a traffic lane VC, which may be different from the traffic lane VC of the first vehicle 170. When the element 180 is mobile, it circulates for example on the traffic lane VC or beside it (typically when the first mobile element is a living being). When the element 180 is fixed, it can be positioned at the traffic lane VC, typically beside or above it.

Each second terminal 130 can thus be positioned on a vehicle 180, typically inside the vehicle 180, or incorporated into the vehicle 180, i.e. forming part of the onboard systems of the vehicle 180.

Each vehicle 170, 180 can take the form of a motor vehicle such as a motor car, a delivery van, a truck, a coach bus or a two-wheeler, a bicycle, a train, a tram or else a boat or an airplane. Additionally, the traffic lanes VC mentioned in this document can be land, sea or air lanes. In addition, each vehicle 170, 180 can be an autonomous vehicle.

The emergency management service server is a server linked to an emergency management service, this service typically offering users of this service the ability to indicate an emergency state of the vehicle.

The remote server 120 is a server able to store a plurality of information elements described hereinafter, relating to the first vehicle 170 and each traffic lane element 180. The remote server 120 is thus able to use these information elements in order to remotely manage the emergency state of a vehicle such as the first vehicle 170.

Figure 2:
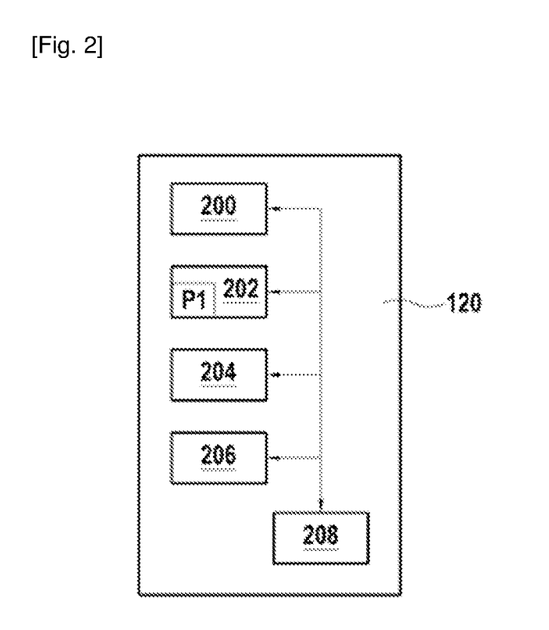
FIG. 2 schematically represents a server remote from the managing system of FIG. 1.

As shown in FIG. 2, the remote server 120 has the conventional architecture of a computer. The remote server 120 particularly includes a processor 200, a read-only memory 202 (of ROM type), a rewritable non-volatile memory 204 (of EEPROM or Flash NAND type), a rewritable volatile memory 206 (of RAM type), and a communication interface 208.

The read-only memory 202 of the remote server 120 constitutes a recording medium in accordance with an exemplary embodiment of the invention, readable by the processor 200 and wherein is recorded a computer program P1 in accordance with an exemplary embodiment of the invention. In a variant, the computer program P1 is stored in the rewritable non-volatile memory 204.

The computer program P1 may allow the remote server 120 to implement at least a part of the managing method in accordance with an exemplary embodiment of the invention.

This computer program P1 can thus define functional and software modules of the remote server 120, configured to implement the steps of a managing method in accordance with an exemplary embodiment of the invention, or at least a part of these steps. These functional modules are based on or control the hardware elements 200, 202, 204, 206 and 208 of the platform 110 previously mentioned. They may in particular here comprise the receiving module, the estimating module and the sending module of the system 100.

The first terminal 110, each second terminal 130, and/or the emergency management service server can also have the conventional architecture of a computer, and can then each particularly include a processor, a read-only memory (of ROM type), a rewritable non-volatile memory (of EEPROM or Flash NAND type for example), a rewritable volatile memory (of RAM type), and a communication interface.

Each read-only memory may constitute a recording medium in accordance with an exemplary embodiment of the invention, readable by the associated processor and on which is recorded a computer program in accordance with an exemplary embodiment of the invention. As a variant, the computer program is stored in the associated rewritable non-volatile memory. The computer program can allow the implementation of at least a part of the managing method in accordance with an exemplary embodiment of the invention.

Each computer program can thus define functional and software modules configured to implement the steps of a managing method in accordance with an exemplary embodiment of the invention, or at least a part of these steps. These functional modules are based on or control the hardware element mentioned previously and may in particular comprise the receiving module, the estimating module and the sending module of the system 100.

Furthermore, each second terminal 130 may comprise an onboard camera, a speed camera, a microphone, a laser scanner and/or a GPS or Galileo guiding means.

In a variant each element 180 of a traffic lane may comprise an onboard camera, a speed camera, a microphone and/or a GPS or Galileo guiding means, to which the second terminal 130 has access.

Figure 3:
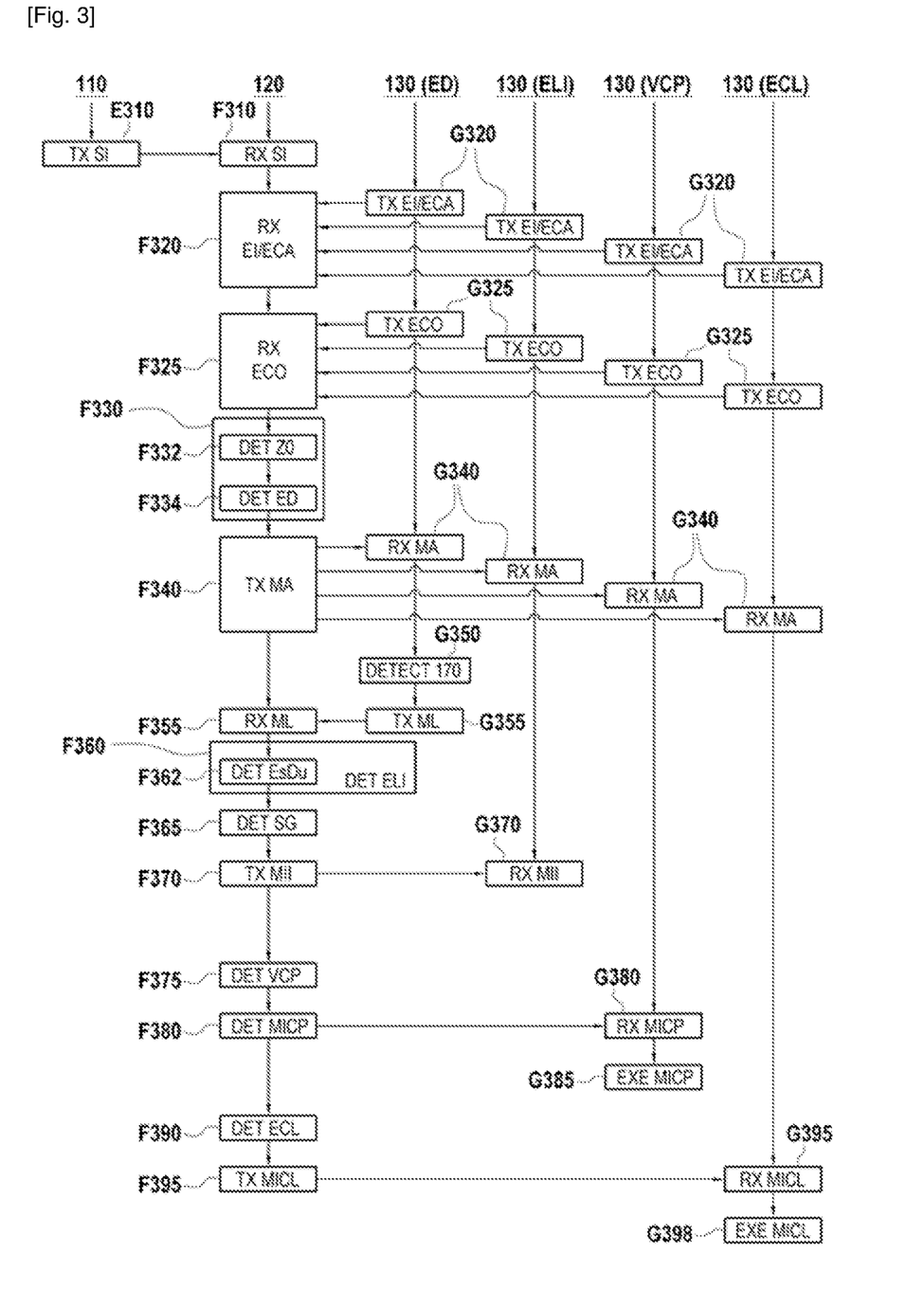
FIG. 3 represents, in the form of a flow chart, the main steps of a managing method according to an exemplary embodiment of the invention.

FIG. 3 shows a method 300 for managing an emergency state of a first vehicle, according to an exemplary embodiment of the invention.

The method may be implemented by the managing system 100 described with reference to FIGS. 1 and 2. The first vehicle 170 in an emergency state is then the first vehicle 170 described with reference to FIG. 1.

In a step E310, a first indication SI of the emergency state of the first vehicle 170 is transmitted. The indication SI is typically transmitting in the form of a message and via the telecommunications network 160. In addition, the indication SI is typically received by the remote server 120 (step F310).

The emergency state can be an urgency state or an offence state.

The urgency is typically a medical or life-threatening urgency, relating to one or more living beings such as human beings. The urgency thus for example relates to an injured person or a woman in labor.

The first vehicle 170 may transport one or more living beings in an urgency situation to a place where the urgency can be handled such as a medical facility, or go to a place where one or more living beings are in an urgency situation, such as a place where an accident has happened.

The offence can be the theft of the first vehicle 170, a highway code offence by means of the first vehicle 170, the taking of a hostage by means of the first vehicle 170, etc. The destination of the first vehicle 170 is then generally not known.

The indication SI may comprise at least one element of identification of the first vehicle 170, and/or at least one characterizing element of the first vehicle 170, in the form of digital data.

The identifying element is typically the registration plate of the first vehicle 170 or the MSISDN (Mobile Station Integrated Services Digital Network) number of the first terminal 110 associated with the first vehicle 170. Furthermore, each characterization element may indicate:
  the category to which the first vehicle 170 belongs, i.e. indicate whether the first vehicle 170 is a motor car, a truck, a coach bus, a two-wheeler, a bicycle, a train, a tram, a boat, an airplane etc.,
  a sub-category of the category to which the first vehicle 170 belongs. For example, this information may pertain to the type of vehicle, mark of the vehicle, model of the vehicle, color of the vehicle etc.,
  the number and/or type of person on board the first vehicle 170,
  the ability of the first vehicle 170 to communicate or otherwise with the remote server 120.

Furthermore, the indication SI may comprise in the form of digital data an information element relating to the type of emergency state of the first vehicle 170. (urgency state or offence state), and where applicable relating to the sub-type of state (road accident, a woman about to give birth, an unconscious person, a broken bone, a burn, theft, taking of a hostage, highway code offence etc.)

In addition, the indication SI may comprise in the form of digital data an information element relating to the so-called confirmed departure point of the first vehicle 170, an information element relating to the so-called confirmed arrival point of the first vehicle 170, and/or an information element relating to one or more potential itineraries of the first vehicle 170, each itinerary being able to be divided into a plurality of potential trajectories. The arrival point and the itinerary are not however generally entered when the emergency state is an offence state.

The term "confirmed" is here used to denote a departure point, an arrival point or a known itinerary of the first vehicle 170. The term "potential" is used to denote a departure point, an arrival point or an itinerary of the first vehicle 170 which is unknown or uncertain, but which can respectively be the departure point, the arrival point or the itinerary of the first vehicle 170.

Furthermore, the indication SI may comprise in the form of digital data a timestamp, the timestamp typically indicating the date and time (minutes and/or seconds included) corresponding to the identification of the emergency state of the first vehicle 170.

In a variant, the indication SI may comprise a digital photograph, a digital sound and/or a digital video on the basis of which the identifying and/or characterizing elements can be extracted by the remote server 120. A photograph of the first vehicle 170 can thus be transmitted, the remote server 120 being able for example to determine by image analysis the registration plate of the first vehicle 170, the category of the first vehicle 170, the color of the first vehicle 170, etc.

When the emergency state is an urgency state, the indication SI of the emergency state is typically transmitted by the first terminal 110 associated with the first vehicle 170. In a variant, the indication SI may be transmitted by a bystander outside the first vehicle 170, by means of another terminal, the so-called third-party terminal.

When the emergency state is an offence state, the indication SI of the emergency state is typically transmitted by a bystander outside the first vehicle 170 (or the owner of the first vehicle 170 in the event of theft), by means of a third-party terminal.

The transmission of the indication SI can be triggered by a validation of a user at the first terminal 110 or the third-party terminal. In a variant, the transmission of the indication SI can be triggered automatically.

Each identifying or characterizing element of the first indication SI can have been previously stated, for example during the registration of the user with the emergency management service, or stated by the user just before the triggering of the sending, for example via a computer application or an Internet site.

Furthermore, each possible information element relating to the type or sub-type of the emergency state, the confirmed departure point, the confirmed arrival point, and/or the potential itinerary or itineraries of the first vehicle 170 may be stated by the user just before the triggering of the sending, or obtained from a GPS or Galileo guiding means.

The first indication SI of the urgency state can also take the form of a phone call to an emergency management service, to allow the first indication SI in most cases, even by a bystander outside the first vehicle 170, by means of another terminal.

Following the step E310, the remote server 120 records the elements received in the indication SI in order to store them. The remote server 120 is then able to transmit these elements to terminals in subsequent steps. The remote server 120 can where applicable send a message to the first terminal 170 or the third-party terminal in order to request details about the indication.

When the first vehicle 170 comprises a GPS tracking device, geolocation data can be automatically supplied by the latter and sent to the remote server 120, for example according to the ETSI EN 302 636 standard.

In a so-called preliminary step G320 that can be implemented before, during and/or after the step E310, one or more second terminals 130 associated with traffic lane elements 180 can send one or more identifying elements EI and/or one or more characterizing elements ECA. Each identifying EI and/or characterizing ECA element is sent by a second terminal 130 given to the remote server 120 via the telecommunications network 160, and relates to the element 180 associated with said second terminal 130.

In a variant, the identifying EI and/or characterizing ECA elements relating to one or more traffic lane element 180 are sent by different terminals than the second terminals 130 associated with these elements 180. Each identifying EI and/or characterizing ECA element can then typically be previously detected by the terminal sending this element, for example by analysis of images of electromagnetic signals.

Each identifying element EI sent by a traffic lane element is typically the MSISDN number of the second terminal 130 associated with the traffic lane element 180. In a variant, the identifying element EI can be the registration plate number of the traffic lane element.

Furthermore, each characterizing element ECA of a traffic lane element 180 may indicate:
- the category to which the traffic lane element belongs 180, i.e. indicate whether the element 180 is fixed or mobile, or more precisely if the element 180 is a motor vehicle, a truck, a coach bus, two-wheeler, a bicycle, a train, a tram, a boat, an airplane, a human being, an animal, a road sign, a speed camera, a surveillance camera, etc.,
- a sub-category of the general category to which the traffic lane element 180 belongs. For example, if the element 180 is a vehicle, this information can pertain to the type of vehicle, the mark of the vehicle, model of the vehicle, color of the vehicle etc.,
- the degree of autonomy of the traffic lane element 180, and
- an ability to intervene.

The category and subcategory can be sent in a message of CAM (Cooperative Awareness Message) type, defined in the ETSI EN 302 637-2 standard, or another type of message defined by another telecommunication standard.

The degree of autonomy here denotes the ability of the element 180 to follow and/or respond to an instruction such as an instruction sent in the steps F380 and/or F395 described hereinafter. For example, an entirely autonomous vehicle can automatically act on the instruction and thus perform the associated maneuver, a vehicle possessing assisted driving may require an acknowledgement from the driver, and a vehicle not possessing assisted driving does not respond to the instructions.

The ability to intervene can be a characterizing element of an element 180 when this element 180 is a vehicle. The ability to intervene indicates whether or not the vehicle can be determined as being an intervening vehicle in the step F360 described hereinafter. This is typically the case when the vehicle is a priority emergency services vehicle, and thus vehicle accredited to intervene in an emergency situation or a vehicle possessing alert means such as a siren or a flashing light to be able to intervene in the emergency situation.

Each identifying EI or characterizing ECA element of a traffic lane element 180 is typically sent by the second terminal 130 associated with the element 180 during the registration of the second terminal 130 associated with the element 180 to the emergency management service or during the registration of the traffic lane element 180.

In a variant, each identifying EI or characterizing ECA element can be sent by the second terminal 130 associated with the element 180 during an outfitting of the second terminal 130 associated with the traffic lane element 180, or at the start of a journey.

The second terminal 130 associated with the traffic lane element 180 can then keep all or part of the data, and send it to the remote server 120 after being authenticated to the remote server 120, which makes it possible to preserve the anonymity of the data when the method is not implemented.

In a variant, in order to avoid an excessively high data transfer volume, the second terminal 130 associated with the traffic lane element 180 can send a link to a storage space of another remote server, typically after authenticating the second terminal 130 to the remote server 120 and where applicable to the other remote server.

Of course, the sending of one or more identifying EI or characterizing ECA elements can be repeated one or more times in order to update this element or elements in the remote server 120.

The remote server 120 receives the identifying EI or characterizing ECA elements in a step F320, then records them in order to store it, typically securely, where applicable after having certified them.

Furthermore, one or more second terminals 130 associated with traffic lane elements 180 can send, for example periodically, one or more contextual elements ECO, typically to the remote server 120 via the telecommunications network 160 (step G325). Each contextual element ECO sent by a second terminal 130 relates to the traffic lane element 180 associated with this second terminal 130.

In a variant, the contextual elements ECO relating to a traffic lane element 180 can be sent by a different terminal than the second terminal 130 associated with this traffic lane element 180. Each contextual element ECO can then be previously detected by the terminal sending this contextual element ECO, for example by analysis of images or electromagnetic signals.

Each contextual element ECO sent can be:
- a geolocation position of the traffic lane element 180,
- a provisional itinerary of the traffic lane element 180, the itinerary being able to be divided into a plurality of provisional trajectories,
- the speed of the traffic lane element 180,
- an item of information related to the traffic in the environs of the geolocation position of the traffic lane element 180 etc.

The contextual element or elements ECO can be sent in a message of CAM (Cooperative Awareness Message) type, defined in the ETSI EN 302 637-2 standard, or another type of message defined by another telecommunication standard.

The remote server 120 receives the contextual element or elements ECO in a step F325, then records them in order to store it, typically securely, where applicable after certifying them.

The sending of one or more contextual elements ECO can be repeated one or more times in order to update this contextual element or element ECO in the remote server 120. This repetition can be periodic.

In a step F330, the remote server 120 determines at least one so-called detecting element ED from among the traffic lane elements 180 for which one or more identifying EI, characterizing ECA and/or contextual ECO elements have been sent in the steps G320 and G325, each detecting element ED being able to detect the first vehicle 170.

In a sub-step F332, the remote server 120 estimates a first geographical area ZO in which the first vehicle 170 is able to be positioned for a given time period.

The term "able to be positioned" is understood to mean that the probability that the first vehicle 170 is positioned in the geographical area ZO is high and for example virtually certain, for example above 40% and preferably above 70%.

The time period begins for example on the date and time of the timestamp received in the step F310, and the duration of the time period is typically of a few minutes, and is for example less than or equal to two minutes. This is because, beyond these few minutes, the uncertainty concerning the location of the first vehicle 170 is too great for the probability of a traffic lane element 180 being able to detect the first vehicle 170 to be significant. The time period is typically determined as a function of the chosen probability threshold relating to the presence of the first vehicle 170 in the first geographical area ZO.

The duration of the time period is typically determined as a function of a potential travel speed of the first vehicle 170 and the number of potential alternative traffic lanes per unit surface area in the area around the first vehicle 170 (the first vehicle 170 can change lane every 20 kilometers on a freeway, and every 100 meters in the city, the uncertainty on its trajectory thus being higher in the second case).

The duration of the time period can further be determined as a function of the traffic on the trajectory of the first vehicle 170, and/or a trajectory hypothesis of the first vehicle 170, for example determined in the step G350.

The first geographical area ZO is typically estimated as a function of at least one potential itinerary of the first vehicle 170, each potential itinerary being able to be divided into a plurality of potential trajectories.

A list of potential itineraries comprising at least one potential itinerary of the first vehicle 170 can thus be determined, typically by the remote server 120.

When the indication SI received in step F310 comprises the element of information relating to the potential itinerary or itineraries of the first vehicle 170, each potential itinerary indicated by this element of information is added to the list of potential itineraries.

When the indication SI received in step F310 comprises the element of information relating to the confirmed departure point of the first vehicle 170 and the element of information relating to the confirmed point of arrival of the first vehicle 170, the remote server 120 determines one or more potential itineraries as a function of these elements of information relating to the confirmed departure and arrival points, then adds this potential itinerary or itineraries to the list of potential itineraries. For example, a single optimal trajectory can be determined.

When the indication SI received in step F310 does not comprise any element of information relating to the confirmed departure point of the first vehicle 170, one or more potential departure points of the first vehicle 170 may be determined by the remote server 120.

Similarly, when the indication received in step F310 does not comprise any element of information relating to the confirmed departure point of the first vehicle 170, one or more potential arrival points of the first vehicle 170 may then be determined by the remote server 120.

One or more potential itineraries may be determined by the remote server 120 on the basis of each pair of a potential departure point and a potential arrival point, of each pair of a confirmed departure point and a potential arrival point, and/or each pair of a potential departure point and a confirmed arrival point, each potential itinerary then being added to the list of potential itineraries.

When the indication SI received in step F310 does not comprise any element of information relating to the confirmed departure point of the first vehicle 170 (the departure point of the first vehicle 170 not being known), a departure area of the first vehicle 170 can be determined.

For example, when the indication SI of the urgency state takes the form of a message, the terminal having sent the message can be located on the basis of this sending in order to determine the departure area. In addition, when the indication SI of the urgency state takes the form of a phone call, the phone call can be located in order to determine the departure area.

The determining of a departure area is typically followed by the determining of one or more potential departure points in the departure area, then the determining, for each determined potential departure point, of one or more potential itineraries on the basis of said potential departure point, each potential itinerary then being added to the list of potential itineraries.

When the emergency state is an urgency state and when the indication SI comprises the element of information relating to a confirmed departure point and the element of information relating to the sub-type of urgency state of the first vehicle 170, one or more potential arrival points can be determined as a function of the element of information relating to the confirmed departure point and the element of information relating to the sub-type of urgency state.

The remote server 120 can then determine one or more arrival points corresponding to the emergency response site nearest to the confirmed departure point.

Specifically, in certain urgency situations such as a departure to a maternity ward, the user of the first terminal 110 may be incapable of indicating the coordinates of the maternity ward. In addition, after a road accident, the user of the first terminal 110 may not know the location of the nearest hospital.

Next, for each determined potential arrival point, one or more potential itineraries may be determined on the basis of the confirmed departure point and said determined potential arrival point, each potential itinerary then being added to the list of potential itineraries.

The first geographical area ZO is typically estimated such as to comprise one or more successive portions of each potential itinerary of the list of potential itineraries, able to be followed by the first vehicle 170 for the given time period. The first geographical area ZO is thus expanded when the departure point or the arrival point of the first vehicle 170 is not known. In addition, the surface area of the first area ZO depends on the duration of the given time period, this time period being itself determined by the speed of the first vehicle 170, of the traffic on its trajectory, etc.

In a variant, when the indication SI received in the step F310 does not comprise any element of information relating to the confirmed departure point of the first vehicle 170, no element of information relating to the confirmed arrival point of the first vehicle 170 and no element of information relating to the potential itinerary or itineraries of the first vehicle 170 (which is generally the case when the emergency state of the first vehicle 170 is in an offence state), the first geographical area ZO is typically estimated as a function of a departure area, of the potential speed of the first vehicle 170 and/or the timestamp.

In a sub-step F334, the remote server 120 determines the detecting element or elements ED able to be positioned in the first geographical area ZO during the given time period, as a function of the identifying EI, characterizing ECA and/or contextual ECO elements sent in the steps G320 and G325.

In a step F340, the remote server 120 sends, via the telecommunications network 160, an alert message MA to at least one of the detecting elements ED in step F330, for example each detecting element ED determined in the step F330. Each alert message MA sent to a detecting element ED is typically received, in a step G340, by the second terminal 130 associated with said detecting element ED.

An alert message MA sent to a given detecting element ED typically indicates that the first vehicle 170 is in an emergency state, and further indicates that the first vehicle 170 is able to be positioned in the first geographical area ZO for the given time period.

Also, the alert message MA may comprise the element of identification of the first vehicle 170, one or more characterizing elements of the first vehicle 170, the information element relating to the type or sub-type of emergency, etc.

The steps F330 and F340 may be repeated one or more times, typically periodically.

Thus, only the elements 180 able to detect the first vehicle 170 and/or the circulation of which risks being affected by the first vehicle 170 are alerted.

In a step G350, at least one detecting element ED detects the first vehicle 170. The detecting element ED then sends, via the telecommunications network 160 (step G355), a location message ML of the first vehicle 170, typically to the remote server 120, which receives it in a step F355.

The steps G350 and G355 are typically implemented by the second terminal 130 associated with the detecting element ED.

The location message ML typically comprises an element of information about the location of the first vehicle 170, and where applicable one or more identifying EI, characterizing ECA and/or contextual ECO elements of the first vehicle 170.

More precisely, during the detecting step G350, the geolocation position and where applicable an element of identification of the first vehicle 170 (typically the registration plate number) may be obtained.

In addition, at least one characterizing element (typically the category, and a sub-category) and/or contextual element of the first vehicle 170 may be obtained during the detecting step G350.

For example, the second terminal 130 associated with the detecting element ED analyzes one or more images obtained by an onboard camera of the second terminal 130 in order to detect and identify the first vehicle 170, or analyzes an electromagnetic signal sent by means of the speed camera from the second terminal 130 or the detecting element ED, reflected by the first vehicle 170, then received by the speed camera.

The second terminal 130 then compares the data obtained to the identifying and/or characterizing elements to determine the presence of the first vehicle 170 received in step G340, in order to determine the presence of the first vehicle 170.

In a variant or in a supplement, the second terminal 130 associated with the detecting element ED detects the implementation, by a cooperating element and/or a collaborating element, of at least one instruction as sent in the step F380 and/or F395 described hereinafter, and deduces therefrom a probability of presence of the first vehicle 170.

The detection can be facilitated by alert signals emitted by the first vehicle 170 and detected by the detecting element ED. The alert signals are for example emitted by a siren, a flashing light or lights (headlamp flashing, hazard lights illuminated). The second terminal 130, having detected these distress signals and having been informed that it is able to detect the first vehicle 170 owing to the alert message received in step G340, can deduce a probability of presence of the first vehicle 170.

The second terminal 130 can also determine, during the detecting step G350, at least one trajectory hypothesis of the first vehicle 110, where applicable associated with a given time period (being typically of a few minutes, for example two minutes). Hypotheses of future positions of the first vehicle 110 may moreover be determined in step G350.

The location message ML of the first vehicle 170 sent by the detecting element ED (step G355) then typically comprises each trajectory hypothesis and/or future position determined in the step G350.

The second terminal 130 typically determines each trajectory hypothesis as a function of the contextual element or elements of the first vehicle 170, previously obtained during the implementation of the detecting step G350.

More precisely, each trajectory hypothesis can be determined on the basis of the geolocation position of the first vehicle 170 and of the direction of circulation of the first vehicle 170 obtained, along with the configuration of the traffic lane network near the geolocation position of the first vehicle 170. It is thus determined which traffic lanes can be taken by the first vehicle 170 being given its geolocation position and its direction of circulation, a trajectory hypothesis corresponding to a lane able to be taken by the first vehicle 170.

The trajectory hypothesis may correspond to a potential trajectory of a potential itinerary of the first vehicle 170, or correspond to a new trajectory in the case where the first vehicle 170 does not follow the potential itinerary or itineraries of the list determined in the step F332.

When the second terminal 130 knows the confirmed arrival point of the first vehicle 170, the trajectory hypotheses are limited to those which can lead to the confirmed arrival point.

A probability rate can be associated with each determined trajectory hypothesis, in order to be able to classify the trajectory hypotheses.

For example, when the confirmed arrival point of the first vehicle 170 is not known to the second terminal 130, the highest probability rate can be associated with the hypothesis relating to a straight-line following of the trajectory, the probability rate relating to any other lane-change hypotheses being lower.

In another example, when the confirmed arrival point of the first vehicle 170 is known to the second terminal 130, the highest probability rate may be associated with a trajectory hypothesis relating to the shortest potential itinerary in duration or else in distance. A recent history of driving choices of the first vehicle 170 could also be used in order to attribute the highest probability rate.

When the step G350 is continuously repeated, each future position hypothesis can be determined as a function of a determined trajectory hypothesis. The hypothesis then relates to the future position at the end of the duration associated with the determined trajectory. The future position hypothesis may further be determined on the basis of the speed of the first vehicle 170 obtained by the second terminal 130 and/or the traffic in the environs of the geolocation position of the first vehicle 170.

In a variant, the hypotheses of future positions are determined by predetermined time increments (10 seconds for example), and this until the end of the duration associated with the determined trajectory. A probability rate can be associated with each future position hypothesis.

The second terminal 130 having detected the first vehicle 170 can further implement an action according to an instruction as sent in the steps F380 and/or F395 described hereinafter.

The steps G350 and G355 are typically repeated one or more times, by the same detecting element ED or a different detecting element ED. The steps G350 and G355 are thus typically implemented periodically or continuously.

The steps F330 of determining detecting elements and the step F340 of sending an alert message may be repeated following each repetition of the steps G350 and G355. The first geographical area ZO is then replaced by a geographical area estimated on the basis of the trajectory hypotheses and/or future positions determined in the step G350, and the time period associated with the first geographical area ZO is replaced by the duration determined in the step G350.

In a variant, the steps G350 and G355 are not implemented since the first vehicle 170 itself sends the location message ML in the step G355, typically periodically. The location message ML typically comprises the element of information of location and where applicable an element of information relating to the itinerary followed by the first vehicle 170. More precisely, when the indication SI sent in the step E310 comprises a characterizing element indicating that the first vehicle 170 is able to (capable of) communicate with the remote server 120, and that the first vehicle 170 sends the location message ML, the steps G350 and G355 are not implemented.

In a step F360, the remote server 120 determines, from among the traffic lane elements 180 for which the identifying EI, characterizing ECA and/or contextual ECO elements have been sent in the steps G320 and G325, one or more vehicles hereinafter referred to as intervening vehicles ELI.

Each intervening vehicle ELI is determined as a function of:
  at least one trajectory hypothesis of the first vehicle 170 and/or at least one future position hypothesis of the first vehicle 170, determined in the step G350,
  of at least one contextual element sent in the step G325, and/or
  at least one characterizing element ECA sent in the step G320, such as the characterizing element ECA indicating the ability to intervene.

Each intervening vehicle ELI is typically determined from among the vehicles 180 for which a characterizing element ECA indicating the ability to intervene has been sent in the step G320.

For example, a single intervening vehicle ELI can be determined, the intervening vehicle ELI typically being a priority emergency services vehicle (such as an ambulance, a fire truck or a police vehicle).

The intervening vehicle ELI is the vehicle 180 able to position itself as near as possible to the first vehicle 170 the most quickly given all the trajectory hypotheses and/or future position hypothesis determined.

In a variant, an intervening vehicle ELI is determined for each trajectory hypothesis and/or future position hypothesis. Several intervening vehicles ELI can then be determined, each intervening vehicle ELI typically being a priority emergency services vehicle, each intervening vehicle ELI being the vehicle 180 able to position itself as near as possible to the first vehicle 170 as quickly as possible given at least one of the trajectory hypotheses and/or future position hypotheses determined. Each intervening vehicle ELI is then assigned to the trajectory hypothesis and/or future position hypothesis for which it is able to position itself as near as possible to the first vehicle 170 the most quickly.

For each priority emergency services vehicle 180, the position, speed and/or category of the priority emergency services vehicle 180 can in particular be taken into account in order to estimate the potential duration EsDu required by this priority emergency services vehicle 180 to meet the first vehicle 170 (step F362).

Each potential duration EsDu can furthermore be estimated on the basis of the typology of the traffic lanes of the itinerary allowing a priority emergency services vehicle 180 to meet the first vehicle 170, and/or the number of vehicles on these traffic lanes, as well as where applicable the number of vehicles able to implement an instruction making it possible to let the intervening vehicle ELI pass, for example as sent in the step F380 described hereinafter.

The priority emergency services vehicle 180 corresponding to the minimum potential duration EsDu is then determined as being the intervening vehicle ELI.

The intervening vehicle ELI can further be determined on the basis of economical and/or technical limitations, such as the fuel consumption of the priority emergency services vehicles 180.

In a variant, each intervening vehicle ELI is not determined from among the vehicles 180 for which a characterizing element ECA indicating the ability to intervene has been sent in the step G320, but can be determined from among traffic lane elements 180/detecting elements ED having indicated via the associated second terminal 130, in a prior step such as the step G320, its agreement to be determined as being an intervening vehicle ELI. This variant is typically implemented when the first vehicle 170 is in the urgency state and when the indication SI sent in the step 310 comprises a characterizing element indicating that the first vehicle 170 is no longer able (capable) to communicate with the remote server 120.

Each intervening vehicle ELI is typically determined from among the detecting elements ED determined during a repetition of the implementation of the step F330, when the first geographical area ZO is replaced by a geographical area estimated on the basis of the trajectory hypotheses and/or future position hypotheses determined in the step G350, and the time period associated with the first geographical area ZO is replaced by the duration determined in the step G350, each detecting element ED being then added to a list of vehicles.

The determination of the intervening vehicle or vehicles ELI is performed in this variant in the same way as for the priority emergency services vehicles. In a variant, several successive vehicles are determined in this way, which makes it possible to better identify the movements of the first vehicle 170.

In this variant wherein the intervening vehicle ELI is a conventional vehicle, a priority emergency services vehicle can nonetheless meet the first vehicle 170. The intervening vehicle ELI then ceases to be an intervening vehicle ELI when the priority emergency services vehicle meets the first vehicle 170.

In a step F365, for each intervening vehicle ELI the remote server 120 can determine a scenario SG for guiding the intervening vehicle ELI toward the first vehicle 170, or else a meeting point between the intervening vehicle ELI and the first vehicle 170. The guiding scenario SG comprises one or more guiding instructions allowing the intervening vehicle ELI to meet the first vehicle 170.

More precisely, the guiding instructions are used to guide the intervening vehicle ELI to the meeting point at the end of the potential duration EsDu. When several trajectory hypotheses are determined in the detecting step G350, the scenario for guiding the intervening vehicle ELI can be determined such as to bring the intervening vehicle ELI closer to a geographical area based on the trajectory hypotheses if it is not already in this area.

Next or in a variant, the trajectory hypothesis being the highest probability rate may be selected by the remote server 120. In a variant, the trajectory hypothesis is selected by a user of the intervening vehicle ELI, the second terminal 130 then transmitting this selection to the remote server 120. For example, when the intervening vehicle ELI is a police vehicle which must meet a stolen vehicle, a police officer can select an area to which it supposes that this stolen vehicle will go, for historic reasons (district associated with car theft) or geographical (area where it is easier to move quickly).

The remote server 120 can then determine the future position hypothesis for which the intervening vehicle ELI will have met the first vehicle 170 at the end of the potential duration EsDu, this future position being called the meeting point. The itinerary of the intervening vehicle ELI and therefore the guiding scenario can then be determined on the basis of the meeting point.

In a step F370, the remote server 120 sends, via the telecommunications network 160, a message of instruction to intervene MII to each intervening vehicle ELI determined in the step F360, the message of instruction to intervene MII being typically received in a step G370 by the second terminal 130 associated with the intervening vehicle ELI.

The message of instruction to intervene typically comprises an instruction to intervene, indicating to the intervening vehicle to meet the first vehicle 170 such as to give way to it when the first vehicle 170 is in an urgency state, or such as to stop the first vehicle 170 when the first vehicle 170 is in an offence state.

In addition, the message of instruction to intervene may comprise the guiding scenario or the meeting point determined in the step F365. The message of instruction to intervene can further comprise an instruction to act such as, for example, to activate a flashing light or a siren.

When the message of instruction to intervene comprises the meeting point, the meeting point can be entered into the guiding means of the intervening vehicle ELI.

The first vehicle 170 being a moving destination and the trajectory of this first vehicle 170 being able to be modified at any time, the steps F365 and F370 can be repeated one or more times, typically continuously or periodically, the period being of a few seconds (for example every 10 seconds).

In a step F375, the remote server 120 determines one or more so-called cooperating vehicles VCP from among the traffic lane elements 180 for which one or more identifying EI, characterizing ECA and/or contextual ECO elements have been sent in the steps G320 and G325.

More precisely, for each intervening vehicle ELI determined in the step F360, the remote server 120 estimates a geographical area of said geographical area associated with the intervening vehicle ELI as a function of the geolocation position of the intervening vehicle ELI.

A time period can be associated with each determined geographical area, and is typically determined as a function of the speed of the intervening vehicle ELI.

The second geographical area associated with the intervening vehicle ELI can also be determined as a function of the trajectory of the intervening vehicle ELI, determined on the basis of the guiding scenario, the second geographical area typically comprising the itinerary followed by the intervening vehicle ELI during the associated time period.

The remote server 120 determines the vehicle or vehicles 180 able to be positioned in the second geographical area associated with the intervening vehicle ELI during the associated time period, as a function of the identifying EI, characterizing ECA and/or contextual ECO elements of these vehicles, these vehicles then becoming cooperating vehicles VCP.

In a step F380, the remote server 120 sends, via the telecommunications network 160, a message of instruction to cooperate MICP to each cooperating vehicle VCP determined in the step F375. In a variant, the message or messages of instruction to cooperate MICP are made available to the associated cooperating vehicles VCP (collection server) by the remote server 120, the associated cooperating vehicles VCP being able for example to obtain the messages of instruction to cooperate MICP by means of their MSISDN number.

Each message of instruction to cooperate MICP sent to a cooperating vehicle VCP is typically received by the second terminal 130 associated with said cooperating vehicle VCP (step G380).

Each message of instruction to cooperate MICP sent to a cooperating vehicle VCP has the aim of facilitating the progress of the intervening vehicle ELI toward the first vehicle 170.

Thus, each message of instruction to cooperate MICP may comprise an instruction to let pass a determined intervening vehicle ELI determined in the step F360. The instruction to let the vehicle pass may comprise an instruction to act with the aim of facilitating the progress of the intervening vehicle ELI toward the first vehicle 170, for example an action to be performed in order to let the vehicle pass, associated with the cooperating vehicle VCP that receives the message of instruction to cooperate MICP, the action making it possible to avoid disrupting the progress of the intervening vehicle ELI, or at least to limit as much as possible any disruption of this progress.

The action to be performed is determined by the remote server 120. The remote server 120 first determines, on the basis of the contextual elements of the cooperating vehicle VCP and of the intervening vehicle ELI, if, during the time period associated with the second geographical area in which the cooperating vehicle VCP may be located at the same time as the intervening vehicle ELI, the cooperating vehicle VCP is able to circulate on the same circulation lane as the intervening vehicle ELI or on a different traffic lane.

If the cooperating vehicle VCP is able to circulate on the same traffic lane, it may be determined whether or not the cooperating vehicle VCP is able to circulate:

on the same traffic sub-lane as the intervening vehicle ELI or on another traffic sub-lane,     in the same direction of traffic as the intervening vehicle ELI or in the opposite direction,     in front of the intervening vehicle ELI or behind the intervening vehicle ELI, and/or     at a lower speed than the speed of the intervening vehicle ELI, or at a higher speed.

If the cooperating vehicle VCP is able to circulate on a different traffic lane, it can be determined whether or not the cooperating vehicle VCP is arriving at an intersection between its traffic lane and the traffic lane of the intervening vehicle ELI.

Characterizing elements relating to the cooperating vehicle VCP can furthermore be considered, such as the category or the sub-category.

The collected information elements, hereinafter referred to as the maneuver framework, then make it possible to determine one or more actions corresponding to the maneuver to be performed. This determination is typically performed in accordance with the step E430 described in the French patent application FR 1 763 134 (the framework of the maneuver corresponding to the concept of event in this application).

A correspondence table can thus be consulted, the correspondence table typically comprising several maneuver frameworks, each maneuver framework being associated with one or more actions that can be performed, predetermined such as to let the intervening vehicle ELI pass.

Each action can be a modification of a driving parameter, such as a change of trajectory or a speed modification (acceleration, slowdown, stop).

For example, a given cooperating vehicle VCP can pull over in order to let the intervening vehicle ELI pass, or accelerate all the way to a further lane portion allowing it to let the intervening vehicle ELI pass, or else yield priority to the intervening vehicle ELI at an intersection such as a roundabout or a traffic light. In another example wherein the cooperating vehicle VCP is able to circulate on the same sub-lane as the intervening vehicle ELI and in front of the intervening vehicle ELI, the action of the cooperating vehicle VCP can be to modify its trajectory in order to typically move away toward the right (in countries where the vehicles drive on the right). In another example wherein the cooperating vehicle VCP is able to circulate on another sub-lane to the intervening vehicle ELI, in front of and in the opposite direction to the intervening vehicle ELI, the action of the cooperating vehicle VCP can be to modify its trajectory in order to typically move away toward the left (in countries where the vehicles drive on the right).

Each instruction to act can be associated with a starting time of performance of the action and/or a provisional duration of the action. Specifically, this action must not be done either too early, since this would disrupt the traffic for no reason, or too late, since this would impede the progress of the intervening vehicle ELI.

The starting time of the performance of the action and/or the provisional duration are obtained as a function of contextual elements of the cooperating vehicle VCP and/or of the intervening vehicle ELI. The speed, trajectory and direction of travel can for example be considered.

The starting time of the performance of the action is typically in the form of a GMT clock time, or in the form of a remaining duration. The starting time of the performance of the action is thus not necessarily immediate.

The degree of autonomy of the cooperating vehicle VCP can also be taken into account during the determination of each instruction. As a non-comprehensive example, when the cooperating vehicle VCP is an autonomous vehicle of an appropriate level (for example level 4 or above), this cooperating vehicle VCP automatically applies the instruction. When the cooperating vehicle VCP is a vehicle not able to receive the message of instruction to cooperate MICP, the cooperating vehicle VCP does not take the instructions into account, and the intervening vehicle ELI must therefore take it into account for the variation in its trajectory and its speed.

In a step G385, one or more cooperating vehicles VCP having received a message of instruction to cooperate MICP (for example each cooperating vehicle VCP) can perform the action of this message's instruction to let the vehicle pass, at the indicated starting time.

The steps F360, F365, F370, F375, F380 and where applicable the step G385 can be repeated, for example until the intervening vehicle ELI has met the first vehicle 170.

In a step F390 which can be implemented at the same time as the step F380, one or more traffic lane elements 180 able to perform an action with the aim of facilitating the circulation of the first vehicle 170 when the emergency state of the first vehicle 170 is an urgency state or to impede the circulation of the first vehicle 170 when the emergency state of the first vehicle 170 is an offence state, are determined by the remote server 120, each element 180 being subsequently referred to as the collaborating element ECL. More precisely each collaborating element ECL is searched for among the traffic lane elements 180 for which one or more identifying EI, characterizing ECA and/or contextual ECO elements have been sent in the steps G320 and G325.

Each collaborating element ECL is determined as a function of one or more contextual elements of said collaborating element ECL, such as its geolocation position, its provisional itinerary, its speed, the traffic in the environs of its geolocation position, its provisional trajectory etc., and as a function of the trajectory hypothesis of the first vehicle 170 selected in the step F375.

Thus, when it is determined as a function of the contextual elements that a traffic lane element 180 is able to be positioned on the traffic lane of the first vehicle 170 and in front of this first vehicle 170, or to be positioned in front of the first vehicle 170 near this traffic lane (for example at an intersection), said element 180 is then determined as being a collaborating element ECL.

In a step F395 the remote server 120 or the first terminal 110 sends, via the telecommunications network 160, a message of instruction to collaborate MICL to each collaborating element ECL determined in the step F390.

Each message of instruction to collaborate MICL sent to a collaborating element ECL is typically received by the second terminal 130 associated with said collaborating element ECL (step G395).

Each message of instruction to collaborate MICL may comprise the element of identification of the first vehicle 170, one or more characterizing and/or contextual elements of the first vehicle 170, the information element relating to the type and/or sub-type of an emergency state, and/or the trajectory hypothesis selected in the step F375.

Each instruction message may comprise an instruction to act aiming to facilitate or impede the progress of the first vehicle 170. Each instruction to act may be associated with a starting time of the performance of the action and/or a provisional duration of the action.

When the emergency state of the first vehicle 170 is an offence state, each instruction to act can more precisely have the aim of instigating or prompting a change of itinerary of the first vehicle 170, such as to slow down the progress of the first vehicle 170 and thus to reduce the duration required by the intervening vehicle ELI to meet the first vehicle 170.

When the collaborating element ECL is a collaborating vehicle, each action can be a modification of a driving parameter, such as a change of trajectory or a speed modification (typically a slowdown or a stop). When the collaborating element ECL is a traffic light, the action can be a modification of the color of the light, typically going to red.

Several instructions to act can thus be sent to collaborating elements ECL such as to slow down the traffic on certain traffic lanes, such as to prompt or compel the first vehicle 170 to choose a traffic lane in accordance with the wishes for progress of the intervening vehicle ELI toward the first vehicle 170.

An instruction to slow down or stop can for example be sent to one or more collaborating vehicles ECL positioned in front of the first vehicle 170 and on the same traffic lane, fifteen vehicles being for example able to be positioned between the first vehicle 170 and the collaborating vehicles ECL in order to limit the risk of reprisals from the occupants of the first vehicle 170.

An instruction to slow down or stop can also be sent to one or more collaborating vehicles ECL positioned in front of the first vehicle 170 and another traffic lane, in order to minimize the changes that the first vehicle 170 commits to this other traffic lane.

An instruction to go to a red light can further be sent to a traffic light so that it can change to red more quickly than planned.

An instruction message can further be sent to the first vehicle 170, such as to modify the guiding means of the first vehicle 170. For example, an instruction sent can modify the guiding means such that it indicates a false bottleneck on traffic lanes for which it is not desirable that the first vehicle 170 enters, or else such that it indicates a false one-way street.

The guiding means can then propose another traffic lane, for example a dead end. Such a proposal can furthermore be part of the instruction of the instruction message sent.

When the emergency state of the first vehicle 170 is an urgency state, each message of instruction to collaborate MICL may comprise an instruction to let the first vehicle 170 pass. The instruction to let the vehicle pass may comprise a sub-instruction of an action to be performed in order to let pass, associated with the collaborating element ECL, typically determined in the same way as the action determined in the step F380.

Each action can thus be a modification of a driving parameter, such as a trajectory change or a modification of speed (acceleration, slowdown, stop).

In a step G398, at least one collaborating element ECL having received a message of instruction to collaborate MICL implements the instruction of this message, typically at the indicated starting time.

The steps F390, F395 and where applicable the step G398 can be repeated, for example until the first vehicle 170 has reached the confirmed arrival point or until the first vehicle 170 has stopped.

The steps F310, F320, F325, F330, F332, F334, F340, F355, F360, F365, F370, F375, F380, F390, F395 are typically implemented by the remote server 120. In a variant, one or more of these steps can be implemented by a second terminal 130 associated with a traffic lane element 180 and/or the first terminal 110 associated with the first vehicle 170.

The invention claimed is:

1. A method for managing an emergency state of a first vehicle, implemented by a managing device, wherein the method comprises:
   estimating a geographical area in which the first vehicle is able to be positioned for a given time period,
   sending an alert message to at least one detecting element, positioned at a traffic lane, said at least one detecting element being able to be positioned in the first geographical area for the given time period, the alert message comprising an element of identification of the first vehicle allowing detection of the first vehicle by the detecting element, and
   receiving a location message of the first vehicle, comprising at least one trajectory hypothesis and/or at least one future position hypothesis of the first vehicle, said location message coming from said at least one detecting element.

2. The method according to claim 1, wherein the geographical area is estimated as a function of said at least one trajectory hypothesis and/or said at least one received future position hypothesis of the first vehicle.

3. The method according to claim 1, wherein a duration of the given time period is determined as a function of at least one element from among the following elements:
   a potential travel speed of the first vehicle,
   a number of potential alternative traffic lanes by unit surface in an area around the first vehicle,
   estimated traffic on the trajectory hypothesis of the first vehicle.

4. The method according to claim 1, further comprising:
   determining an intervening vehicle as a function of said at least one trajectory hypothesis and/or at least one future position hypothesis, the intervening vehicle being a vehicle for which an estimate of a potential duration required by said intervening vehicle to meet the first vehicle is minimal, and
   sending a message of instruction to intervene to a terminal associated with the intervening vehicle comprising an instruction to intervene.

5. The method according to claim 4, wherein the message of instruction to intervene further comprises a scenario for guiding the intervening vehicle toward the first vehicle, said guiding scenario comprising guiding instructions.

6. The method according to claim 4, further comprising:
   estimating a second geographical area associated with said intervening vehicle, as a function of a geolocation position of the intervening vehicle,
   determining at least one cooperating vehicle able to be positioned in said second geographical area,
   sending a message of instruction to cooperate to a terminal associated with said at least one cooperating vehicle, comprising an instruction to act with an aim of facilitating progress of the intervening vehicle toward the first vehicle.

7. The method according to claim 4, further comprising:
   determining at least one collaborating element able to be positioned before the first vehicle, as a function of said at least one trajectory hypothesis and/or at least one future position hypothesis,
sending a message of instruction to collaborate to a terminal associated with said at least one collaborating element, comprising in instruction to act to facilitate or impede progress of the first vehicle, such as to reduce a duration required by the intervening vehicle to meet the first vehicle.

8. The method according to claim 6, wherein:
   the instruction to act is associated with a starting time of an action and/or a provisional duration of the action, and
   the instruction to act pertains to the modification of a driving parameter.

9. The method according to claim 1, wherein:
   wherein the alert message sent by the managing device is sent to trigger a start of detection of the first vehicle by said at least one detecting element, and wherein the location message is received by the managing device in response to a detection of the first vehicle by said at least one detecting element.

10. A device for managing an emergency state of a first vehicle, comprising:
 a processor; and
 a non-transitory computer-readable medium comprising instructions stored thereon which when executed by the processor configure the device to:
 estimate a geographical area in which the first vehicle is able to be positioned for a given time period,
 to send an alert message to at least one detecting element, positioned at a traffic lane, said at least one detecting element being able to be positioned in the first geographical area for the given time period, the alert message comprising an element of identification of the first vehicle allowing the detection of the first vehicle by the detecting element, and
 receive a location message of the first vehicle, comprising at least one trajectory hypothesis and/or at least one future position hypothesis of the first vehicle, said location message being sent coming-from said at least one detecting element.

11. A non-transitory recording medium readable by a computer on which is recorded a computer program comprising instructions for executing a method for managing an emergency state of a first vehicle, when the instructions are executed by a processor of a managing device, wherein the instructions configure the managing device to:
 estimate a geographical area in which the first vehicle is able to be positioned for a given time period;
 send an alert message to at least one detecting element, positioned at a traffic lane, said at least one detecting element being able to be positioned in the first geographical area for the given time period, the alert message comprising an element of identification of the first vehicle allowing the detection of the first vehicle by the detecting element; and
 receive a location message of the first vehicle, comprising at least one trajectory hypothesis and/or at least one future position hypothesis of the first vehicle, said location message being sent coming from said at least one detecting element.

* * * * *